(12) United States Patent
Ikeda

(10) Patent No.: US 6,717,630 B1
(45) Date of Patent: Apr. 6, 2004

(54) LIQUID CRYSTAL DISPLAY DEVICE AND METHOD OF FABRICATING THE SAME

(75) Inventor: Munehiro Ikeda, Tokyo (JP)

(73) Assignee: NEC LCD Technologies, Ltd., Kanagawa (JP)

(*) Notice: Subject to any disclaimer, the term of this patent is extended or adjusted under 35 U.S.C. 154(b) by 0 days.

(21) Appl. No.: 09/404,705

(22) Filed: Sep. 23, 1999

(30) Foreign Application Priority Data

Sep. 25, 1998 (JP) .......................................... 10-271140

(51) Int. Cl.⁷ .......................................... G02F 1/1368
(52) U.S. Cl. ..................... 349/43; 349/139; 349/143
(58) Field of Search ........................... 349/43, 44, 139, 349/143, 187; 438/30; 257/59, 72

(56) References Cited

U.S. PATENT DOCUMENTS 5,502,583 A * 3/1996 Sukegawa et al. ............. 349/42
5,682,211 A * 10/1997 Yao et al. ...................... 349/38

FOREIGN PATENT DOCUMENTS

| JP | 53-144297 | 12/1978 |
| JP | 5-80353 | 4/1993 |
| JP | 6-274130 | 9/1994 |
| JP | 7-98462 | 4/1995 |
| JP | 9-230327 | 9/1997 |

* cited by examiner

Primary Examiner—Tarifur R. Chowdhury
Assistant Examiner—Tai Duong
(74) Attorney, Agent, or Firm—Scully, Scott, Murphy & Presser

(57) ABSTRACT

There is provided a liquid crystal display device including (a) a pixel electrode, (b) a first signal line extending along one side of the pixel electrode, and (c) a second signal line extending along the other side of the pixel electrode. A first length along which the pixel electrode and the first signal line are adjacent to each other is equal to a second length along which the pixel electrode and the second signal line are adjacent to each other, a first space between the pixel electrode and the first signal line is equal to a second space between the pixel electrode and the second signal line. The liquid crystal display device makes it possible to minimize imbalance in parasitic capacitances to be generated between the pixel electrode and the first and second signal lines.

18 Claims, 14 Drawing Sheets

Nth Period (N+1)th Period

Nth Period

Figure 4A
*(Prior Art)*

(N+1)th Period

Figure 4B
*(Prior Art)*

Nth Period

Figure 5A
*(Prior Art)*

(N+1)th Period

Figure 5B
*(Prior Art)*

LIQUID CRYSTAL DISPLAY DEVICE AND METHOD OF FABRICATING THE SAME

BACKGROUND OF THE INVENTION

1. Field of the Invention

The invention relates to a liquid crystal display device and a method of fabricating the same, and more particularly to a liquid crystal display device which is capable of eliminating variance in parasitic capacitance to be generated between a pixel electrode and signal lines, and a method of fabricating such a liquid crystal display device.

2. Description of the Related Art

A liquid crystal display device has recently drawn attention as a thin and low power-consumption display to be substituted for a conventional cathode ray tube. In particular, a so-called active matrix type liquid crystal display device, which employs a non-linear device such as a thin film transistor (TFT) and a metal insulator metal (MIM) type transistor as a driver element, has drawn attention due to high quality in display.

Hereinbelow is explained an operation of a conventional liquid crystal display device with reference to FIG. 1 which is a circuit diagram of a circuit equivalent to a pixel.

As illustrated in FIG. 1, a thin film transistor (TFT) 14 is comprised of a drain electrode 14a electrically connected to a first signal line 11i, a source electrode 14b, and a gate electrode 14c electrically connected to a scanning line 12. A pixel electrode 13 is electrically connected to the source electrode 14b. A liquid crystal capacitance 32 having a capacity of $C_{LC}$ and including liquid crystal agent as dielectric material is formed between the pixel electrode 13 and an opposing electrode 33 formed on an opposing substrate.

A liquid crystal display device is generally designed to have a plurality of scanning lines 12 (only one of them is illustrated in FIG. 1) to which a scanning signal is successively applied. In a period other than a scanning period, a scanning signal is not applied to the scanning lines 12, and hence, the drain electrode 14a and the source electrode 14b are electrically insulated from each other. In a scanning period, a scanning signal is applied to the scanning lines 12. The scanning signal activates a channel of the thin film transistor 14, and thus, the drain electrode 14a and the source electrode 14b are electrically connected to each other. At the same time, a signal is applied to the first signal line 11i in accordance with a voltage to be applied to the liquid crystal capacitance 32, which is charged by the signal.

After a scanning period has been over, a scanning signal is no longer applied to the scanning lines 12, resulting in that the drain electrodes 14a and the source electrodes 14b become electrically insulated from each other again. Hence, the liquid crystal capacitance 32 is kept charged, and thus, it is possible to optically control liquid crystal by means of an electric field generated between the opposing electrode 33 and the pixel electrode 13.

In a period other than a scanning period, a quite small amount of current, which is so-called leakage current, flows between the drain electrode 14a and the source electrode 14b. The leakage current reduces a difference in voltage between the pixel electrode 13 and the opposing electrode 33 until a next scanning period. If such a difference in voltage is not reduced, there would caused degradation in contrast, resulting in reduction in display quality.

In order to avoid such degradation in contrast, an auxiliary capacitance 34 having a capacity of $C_s$ is additionally inserted in parallel with the liquid crystal capacitance 32 to thereby prevent reduction in voltage. In the liquid crystal display device illustrated in FIG. 1, the auxiliary capacitance 34 is provided in parallel with the pixel electrode 13 and the thin film transistor 14.

The auxiliary capacitance 34 may be provided at other locations, unless the auxiliary capacitance 34 is in parallel with the liquid crystal capacitance 32.

The liquid crystal display device is designed to include a plurality of such pixels as illustrated in FIG. 1, in an array.

FIG. 2 is a plan view of a pixel of the liquid crystal display device having the above-mentioned structure. In FIG. 2, the auxiliary capacitance 34 illustrated in FIG. 1 is not illustrated for the sake of simplicity.

As illustrated in FIG. 2, the pixel electrode 13 is sandwiched between the first and second signal lines 11i and 11j. In other words, the first signal line 11i extends along one side of the pixel electrode 13, and the second signal line 11j extends along the other side of the pixel electrode 13. Hence, there are generated a first parasitic capacitance 16i having a capacity of Cd-pii between the pixel electrode 13 and the first signal line 11i, and a second parasitic capacitance 16j having a capacity of Cd-pij between the pixel electrode 13 and the second signal line 11j.

The longer the length Li and Lj along which the pixel electrode 13 is adjacent to the first and second signal lines 11i and 11j are, or the shorter the spaces di and dj between the pixel electrode 13 and the first and second signal lines 11i and 11j are, the greater the parasitic capacitances 16i and 16j are. The parasitic capacitances 16i and 16j cause a voltage of the pixel electrode 13 to be influenced by fluctuation in voltage of the first and second signal lines 11i and 11j.

The fluctuation $\Delta Vpi$ in voltage of the pixel electrode 13 is represented as follows.

$$\Delta Vpi = (Cd\text{-pii} \times \Delta Vi + Cd\text{-pij} \times \Delta Vj)/(C_{LC} + C_s + Cd\text{-pii} + Cd\text{-pij})$$

In the equation, $\Delta Vi$ and $\Delta Vj$ represent fluctuation in voltage of the first and second signal lines 11i and 11j, respectively.

Hereinbelow is explained a method of driving the liquid crystal display device illustrated in FIGS. 1 and 2.

It is desirable that an orientation of an electric field to be applied to the liquid crystal capacitance 32, that is, a polarity of the pixel electrode 13 is inverted every period for updating display. This is because if a polarity of the pixel electrode 13 is kept unchanged, there would occur phenomenon called "burning" in which display is fixed when the same image is kept displayed, and display cannot be returned back to original display. This degrades quality in display.

In addition, it is desired that polarity of the pixel electrodes is uniformly distributed in a screen of a liquid crystal display device. The reason is as follows. In an actual liquid crystal display device, there exists a slight difference in brightness in display in accordance with positive or negative polarity of the pixel electrode 13. If the polarity of the pixel electrode 13 in an entire screen alters between positive and negative ones each time display is updated, brightness and darkness are repeated, which remarkably deteriorates visibility.

For this reason, there have been suggested a lot of arrangements of polarity of pixel electrodes in a screen and a lot of methods of driving a liquid crystal display device.

FIG. 3A illustrates polarity of pixel electrodes in a screen in a certain display updating period, and FIG. 3B illustrates polarity of pixel electrodes in a screen in a next display updating period both in gate line inversion drive. Namely, FIGS. 3A and 3B show how polarity of pixel electrodes vary in successive display updating periods in gate line inversion drive. Similarly, FIG. 4A illustrates polarity of pixel electrodes in a screen in a certain display updating period, and FIG. 4B illustrates polarity of pixel electrodes in a screen in a next display updating period both in drain line inversion drive. Namely, FIGS. 4A and 4B show how polarity of pixel electrodes vary in successive display updating periods in drain line inversion drive. FIG. 5A illustrates polarity of pixel electrodes in a screen in a certain display updating period, and FIG. 5B illustrates polarity of pixel electrodes in a screen in a next display updating period both in dot inversion drive. Namely, FIGS. 5A and 5B show how polarity of pixel electrodes vary in successive display updating periods in dot inversion drive.

Herein, the gate line inversion drive means a method of driving a liquid crystal display device, in which pixel electrodes arranged in a direction in which scanning lines extend are designed to have the same polarity, and those polarity are inverted each time display is to be updated. The drain line inversion drive means a method of driving a liquid crystal display device, in which pixel electrodes arranged in a direction in which signal lines extend are arranged are designed to have the same polarity, and those polarity are inverted each time display is to be updated. The dot inversion drive means a method of driving a liquid crystal display device, in which adjacent pixel electrodes are designed to have opposite polarity both in a direction in which scanning lines extend and both in a direction in which signal lines extend, and those polarity are inverted each time display is to be updated.

In FIGS. 3A, 3B, 4A, 4B, 5A and 5B, pixel electrodes having a sign "+" are designed to have a positive polarity, whereas pixel electrodes having a sign "−" are designed to have a negative polarity.

When a liquid crystal display is driven in such a manner as illustrated in FIGS. 3A to 5B, fluctuation in voltage of the signal lines is maximized when polarity of the signal lines are inverted. Accordingly, voltage of a pixel electrode is influenced most remarkably at that time, and hence, brightness is varied.

As is obvious in view of FIGS. 3A, 3B, 4A, 4B, 5A and 5B, adjacent signal lines always have the same polarity in the gate line inversion drive illustrated in FIGS. 3A and 3B. In contrast, adjacent signal lines always have opposite polarity in both the drain line inversion drive illustrated in FIGS. 4A and 4B and the dot inversion drive illustrated in FIGS. 5A and 5B. Hence, influence caused by polarity inversion is cancelled each other in the drain line inversion drive and the dot inversion drive, and hence, it is possible to reduce fluctuation in brightness of a pixel relative to the gate line inversion drive illustrated in FIGS. 3A and 3B.

However, such reduction in fluctuation in brightness of a pixel is eliminated, if the parasitic capacitances Cd-pii and Cd-pij generated between the pixel electrode and the signal lines are quite different from each other. Hence, the parasitic capacitances between the pixel electrode and the signal lines have to be designed to have the same capacity in order to minimize fluctuation in brightness of a pixel, caused by fluctuation in voltage of the signal lines.

As mentioned earlier, the thin film transistor 14 is turned on receipt of a scanning signal transmitted through the scanning line 12 in the conventional liquid crystal display device illustrated in FIG. 2. That is, the drain electrode 14a is electrically communicated to the source electrode 14b. At that time, a liquid crystal capacitance and an auxiliary capacitance (not illustrated) both formed between the pixel electrode 13 and the opposing electrode (not illustrated) are charged by a display signal having been applied to the first signal line 11i, electric charges thus charged in the liquid crystal capacitance and the auxiliary capacitance are kept as they are even after the thin film transistor 14 is turned off. Hence, images can be displayed in a screen.

As illustrated in FIG. 2, the thin film transistor 14 is generally formed in the vicinity of an intersection of the first signal line 11i with the scanning line 12. In such arrangement, the pixel electrode 13 is formed with a cut-out portion in order to avoid interference of the pixel electrode 13 with the thin film transistor 14. The cut-out portion has a length Lt in a direction in which the first signal line 11i extends.

As a result, a length Li along which the pixel electrode 13 is adjacent to the first signal line 11i is not equal to a length Lj along which the pixel electrode 13 is adjacent to the second signal line 11j. Accordingly, if a space di between the pixel electrode 13 and the first signal line 11i is equal to a space dj between the pixel electrode 13 and the second signal line 11j, the parasitic capacitance Cd-pij generated between the pixel electrode 13 and the second signal line 11j is greater than the parasitic capacitance Cd-pii generated between the pixel electrode 13 and the first signal line 11i (Cd-pii<Cd-pij), which is not preferable because voltage of the pixel electrode 13 is influenced by fluctuation in voltage in the signal lines.

In order to solve this problem, Japanese Unexamined Patent Publication No. 5-80353 has suggested various solutions as follows.

First, Japanese Unexamined Patent Publication No. 5-80353 has suggested a method of equalizing parasitic capacitances to each other by setting a space dj between the pixel electrode 13 and the second signal line 11j to be greater than a space between the pixel electrode 13 and the first signal line 11i (di<dj), to thereby ensure that a parasitic capacitance per a unit length between the pixel electrode 13 and the first signal line 11i is greater than the same between the pixel electrode 13 and the second signal line 11j.

However, since the pixel electrode 13 is separately exposed to light from the first and second signal lines 11i and 11j in this method, the spaces di and dj are not always formed equal to designed values due to misalignment of masks in exposure. As a result, the parasitic capacitances are not coincident with each other.

In order to equalize the parasitic capacitances to each other, it would be necessary to design the spaces di and dj so wide that influence caused by misalignment of masks can be ignored. However, this significantly reduces a numerical aperture (NA).

Secondly, Japanese Unexamined Patent Publication No. 5-80353 has suggested a method of equalizing the parasitic capacitances to each other, in which a space dj between the pixel electrode 13 and the second signal line 11j is divided into two regions in one of which the space dj is designed to be equal to a space di between the pixel electrode 13 and the first signal line 11i, and in the other of which the space dj is greater than the space di.

However, this second method cannot sufficiently equalize the parasitic capacitances to each other for the same reason as the above-mentioned first method.

Thirdly, Japanese Unexamined Patent Publication No. 5-80353 has suggested a liquid crystal display device in which the first signal line 11i is designed to have a projection to ensure that a length along which the pixel electrode 13 is adjacent to the first signal line 11i is equal to a length along which the pixel electrode 13 is adjacent to the second signal line 11j.

However, the suggested liquid crystal display device is accompanied with a problem that the parasitic capacitances are not equal to each other due to misalignment of masks.

Fourthly, Japanese Unexamined Patent Publication No. 5-80353 has suggested a liquid crystal display device designed to include a parasitic capacity compensator. In the suggested liquid crystal display device, a signal line branches away. The parasitic capacity compensator is comprised of a branching portion and the signal line which partially interpose a pixel electrode therebetween.

In accordance with the liquid crystal display device, the above-mentioned problem of misalignment of masks can be solved. However, it is necessary in the liquid crystal display device to design a space between the pixel electrode and the branching portion of the signal line in the parasitic capacity compensator smaller than a space between the pixel electrode and the signal line.

In addition, when the signal lines and the pixel electrode are formed in a common layer, they have to be spaced away from each other to some degree in order to avoid short-circuit therebetween. Thus, there is a critical space between the signal lines and the pixel electrode. Hence, if such a critical space is applied to the above-mentioned parasitic capacity compensator, it would be necessary to space the pixel electrode from the signal lines by a distance greater than the critical space. However, this results in reduction in an area of the pixel electrode, which unpreferably causes reduction in a numerical aperture.

Fifthly, Japanese Unexamined Patent Publication No. 5-80353 has suggested a liquid crystal display device in which the parasitic capacity compensator is overlapped the pixel electrode with an insulating film being sandwiched therebetween, and the parasitic capacitances are compensated for by electrostatic capacitance of an overlapping portion of the parasitic capacity compensator.

In accordance with the liquid crystal display device, the problem having been mentioned in the fourth suggestion can be solved. However, the fifth suggestion cannot be applied to a liquid crystal display device in which the pixel electrode and the signal lines are formed in a common layer.

Japanese Unexamined Patent Publication No. 6-274130 has suggested a liquid crystal display device comprised of (a) a first substrate including a switching device, a light-permeable pixel electrode electrically connected to a terminal of the switching device, a first signal line, a second signal line extending adjacently to the first signal line, and a third signal line through which a signal for turning the switching device on or off is transmitted, (b) a second substrate on which an opposing electrode is formed, (c) a drive circuit which applies a signal to the second signal line which signal has a polarity opposite to a polarity of a signal to be applied to the first signal line, and (d) a liquid crystal layer sandwiched between the first and second substrates, the pixel electrode overlapping the first and second signal lines with an insulating thin film being sandwiched therebetween.

However, the suggested liquid crystal display device is accompanied with the above-mentioned problem that a parasitic capacitance generated between the pixel electrode and the first signal line is not equal to a parasitic capacitance between the pixel electrode and the second signal line due to a difference in length between a length along which the pixel electrode is adjacent to the first signal line and a length along which the pixel electrode is adjacent to the second signal line.

SUMMARY OF THE INVENTION

In view of the above-mentioned problems in the conventional liquid crystal display devices, it is an object of the present invention to provide a liquid crystal display device which is capable of minimizing imbalance in parasitic capacitances to be generated between a pixel electrode and first and second signal lines, and hence, ensuring no fluctuation in brightness.

It is also an object of the present invention to provide a method of fabricating such a liquid crystal display device.

In one aspect of the present invention, there is provided a liquid crystal display device including (a) a pixel electrode, (b) a first signal line extending along one side of the pixel electrode, and (c) a second signal line extending along the other side of the pixel electrode, a first length along which the pixel electrode and the first signal line are adjacent to each other being equal to a second length along which the pixel electrode and the second signal line are adjacent to each other, a first space between the pixel electrode and the first signal line being equal to a second space between the pixel electrode and the second signal line.

It is preferable that the pixel electrode includes a region having been exposed to light, at a periphery thereof.

It is preferable that the pixel electrode is formed in a layer in which the first and second signal lines are also formed.

It is preferable that the first and second signal lines are formed in a first layer, and the pixel electrode is formed in a second layer which is electrically isolated from the first layer by an insulating layer sandwiched between the first and second layers.

There is further provided a liquid crystal display device including (a) a pixel electrode, (b) a first signal line extending along one side of the pixel electrode, and (c) a second signal line extending along the other side of the pixel electrode, at least one of the first and second signal lines having a projecting portion extending towards the pixel electrode, a first length along which the pixel electrode and the first signal line are adjacent to each other being equal to a second length along which the pixel electrode and the second signal line are adjacent to each other, a first space between the pixel electrode and the first signal line being equal to a second space between the pixel electrode and the second signal line.

There is still further provided a liquid crystal display device including (a) a pixel electrode, (b) a thin film transistor located adjacent to the pixel electrode and at one side of the pixel electrode, (c) a first signal line extending along the one side of the pixel electrode, and (d) a second signal line extending along the other side of the pixel electrode, the pixel electrode being formed with a cut-out portion at the other side thereof, the cut-out portion having a length equal to a length along which the first signal line cannot be adjacent to the pixel electrode by the thin film transistor, a first length along which the pixel electrode and the first signal line are adjacent to each other being equal to a second length along which the pixel electrode and the second signal line are adjacent to each other, a first space between the pixel electrode and the first signal line being equal to a second space between the pixel electrode and the second signal line.

There is yet further provided a liquid crystal display device including (a) a plurality of pixel electrodes each spaced away from adjacent ones by a predetermined distance, (b) first signal lines each extending along one side of each of the pixel electrodes, each of the first signal lines having a bending portion which extends along a periphery of each of the pixel electrodes, and (c) second signal lines each extending along the other side of each of the pixel electrodes, each of the second signal lines having a bending portion which extends along a periphery of each of the pixel electrodes, at least one of the first and second signal lines having a projecting portion extending towards the pixel electrode, a first length along which the pixel electrode and the first signal line are adjacent to each other being equal to a second length along which the pixel electrode and the second signal line are adjacent to each other, a first space between the pixel electrode and the first signal line being equal to a second space between the pixel electrode and the second signal line.

In another aspect of the present invention, there is provided a method of fabricating a liquid crystal display device including a pixel electrode, a first signal line extending along one side of the pixel electrode, and a second signal line extending along the other side of the pixel line, including the steps of (a) forming a scanning line on a transparent substrate, and then, forming a gate insulating film on the scanning line and the transparent substrate, (b) forming a channel on the gate insulating film above the scanning line, (c) forming the first and second signal lines so that a first length along which the pixel electrode and the first signal line are adjacent to each other is equal to a second length along which the pixel electrode and the second signal line are adjacent to each other, and a first space between the pixel electrode and the first signal line is equal to a second tin space between the pixel electrode and the second signal line, (d) forming the pixel electrode, and (e) covering a product resulting from the step (d) with an insulating film.

It is preferable that the pixel electrode is formed between the first and second signal lines in a common layer in the step (d).

It is preferable that the pixel electrode is formed, after the insulating film has been formed, on the insulating film above a region sandwiched between the first and second signal lines.

There is further provided a method of fabricating a liquid crystal display device including a pixel electrode, a first signal line extending along one side of the pixel electrode, and a second signal line extending along the other side of the pixel line, including the steps of (a) forming a scanning line on a transparent substrate, and then, forming a gate insulating film on the scanning line and the transparent substrate, (b) forming a channel on the gate insulating film above the scanning line, (c) forming the first and second signal lines so that at least one of the first and second signal lines has a projecting portion extending towards the pixel electrode and that a first length along which the pixel electrode and the first signal line are adjacent to each other is equal to a second length along which the pixel electrode and the second signal line are adjacent to each other, and a first space between the pixel electrode and the first signal line is equal to a second space between the pixel electrode and the second signal line, (d) forming the pixel electrode, and (e) covering a product resulting from the step (d) with an insulating film.

There is still further provided a method of fabricating a liquid crystal display device including a pixel electrode, a first signal line extending along one side of the pixel electrode, and a second signal line extending along the other side of the pixel line, including the steps of (a) forming a scanning line on a transparent substrate, and then, forming a gate insulating film on the scanning line and the transparent substrate, (b) forming a channel on the gate insulating film above the scanning line, (c) forming the first and second signal lines so that at least one of the first and second signal lines has a cut-out portion having a length equal to a length along which the first and/or second signal line(s) cannot be adjacent to the pixel electrode by a thin film transistor formed at one side of the pixel electrode, the cut-put portion being formed at the other side of the pixel electrode, a first length along which the pixel electrode and the first signal line are adjacent to each other being equal to a second length along which the pixel electrode and the second signal line are adjacent to each other, a first space between the pixel electrode and the first signal line being equal to a second space between the pixel electrode and the second signal line, (d) forming the pixel electrode, and (e) covering a product resulting from the step (d) with an insulating film.

There is yet further provided a method of fabricating a liquid crystal display device including a plurality of pixel electrodes each spaced away from adjacent ones by a predetermined distance, first signal lines each extending along one side of each of the pixel electrodes, each of the first signal lines having a bending portion which extends along a periphery of each of the pixel electrodes, and second signal lines each extending along the other side of each of the pixel electrodes, each of the second signal lines having a bending portion which extends along a periphery of each of the pixel electrodes, including the steps of (a) forming a scanning line on a transparent substrate, and then, forming a gate insulating film on the scanning line and the transparent substrate, (b) forming a channel on the gate insulating film above the scanning line, (c) forming the first and second signal lines so that at least one of each of the first signal lines and each of second signal lines has a projecting portion extending towards each of the pixel electrodes and that a first length along which each of the pixel electrodes and each of the first signal lines are adjacent to each other is equal to a second length along which each of the pixel electrodes and each of the second signal lines are adjacent to each other, and a first space between each of the pixel electrodes and each of the first signal lines is equal to a second space between each of the pixel electrodes and each of the second signal lines, (d) forming the pixel electrodes, and (e) covering a product resulting from the step (d) with an insulating film.

The advantages obtained by the aforementioned present invention will be described hereinbelow.

In accordance with the present invention, it is possible to equalize parasitic capacitances generated between a pixel electrode and signal lines to each other.

As mentioned earlier, spaces between a pixel electrode and signal lines may be different from each other due to misalignment of masks which might occur when a pixel electrode is exposed to light separately from signal lines. In accordance with the present invention, the parasitic capacitances can be equalized to each other without being influenced by misalignment of masks.

Accordingly, the present invention makes it possible to prevent fluctuation in brightness of a pixel which fluctuation is caused by imbalance in parasitic capacitances between a pixel electrode and signal lines.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 4A illustrates polarity of pixel electrodes in a screen in a certain display-updating period in drain line inversion drive.

FIG. 4B illustrates polarity of pixel electrodes in a screen in a next display-updating period both in drain line inversion drive.

FIG. 5A illustrates polarity of pixel electrodes in a screen in a certain display-updating period.

FIG. 5B illustrates polarity of pixel electrodes in a screen in a next display-updating period both in dot inversion drive.

DESCRIPTION OF THE PREFERRED EMBODIMENTS

Figure 6:
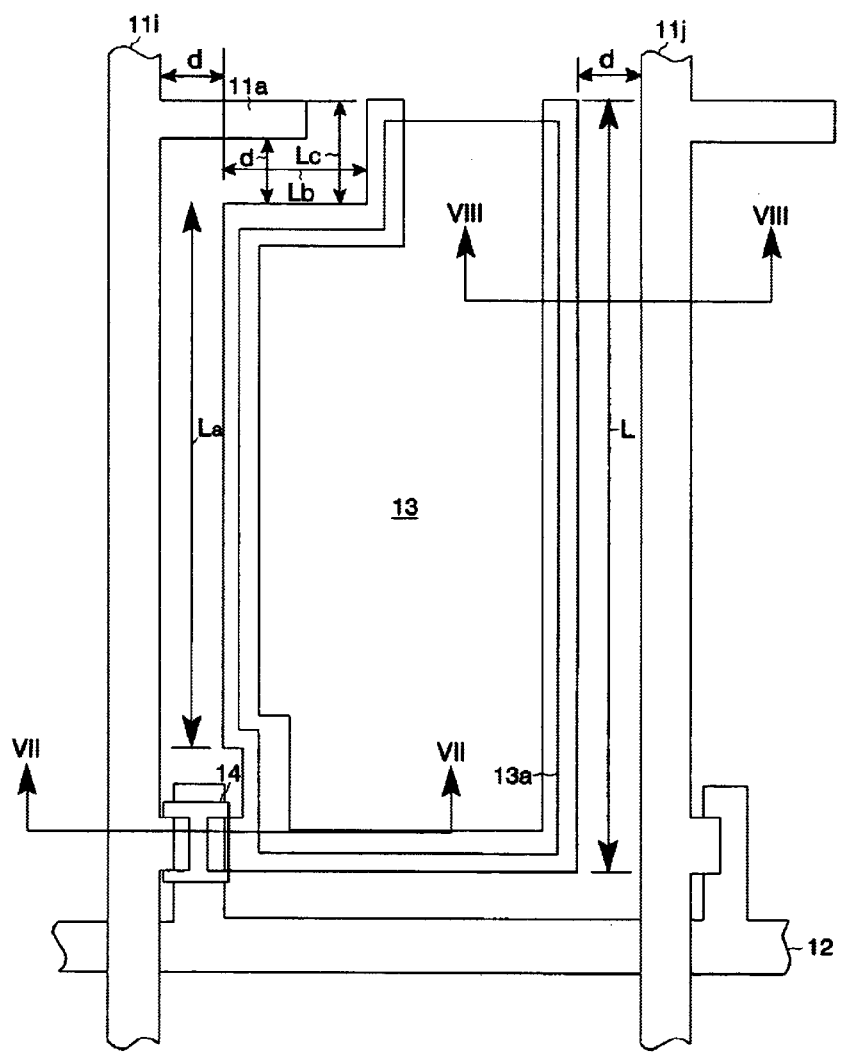
FIG. 6 is a plan view of a TFT substrate in a liquid crystal display device in accordance with the first embodiment of the present invention.
Figure 7:
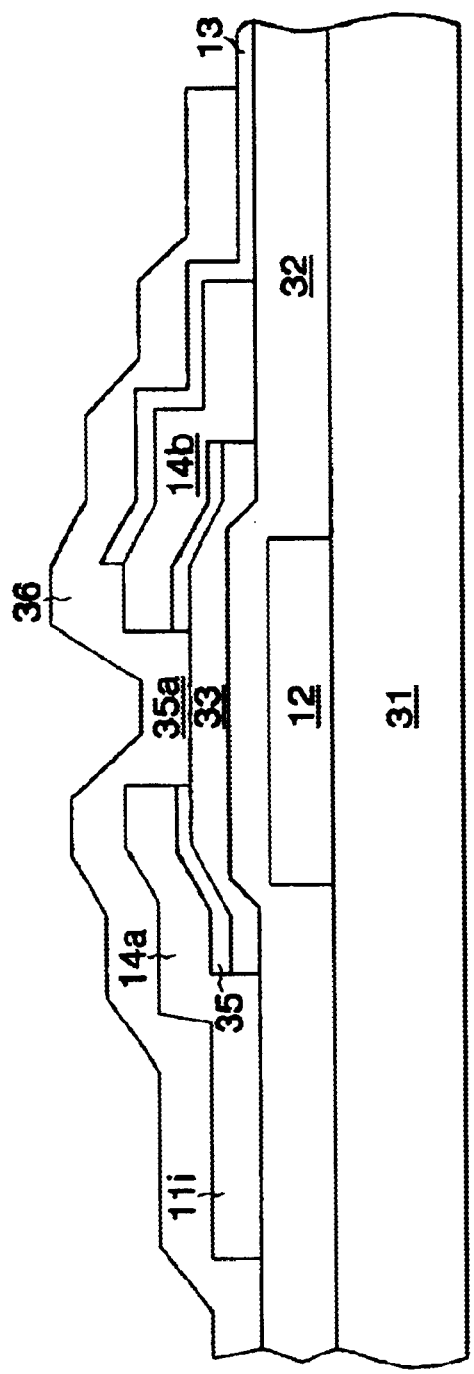
FIG. 7 is a cross-sectional view taken along the line VII—VII in FIG. 6.
Figure 8:
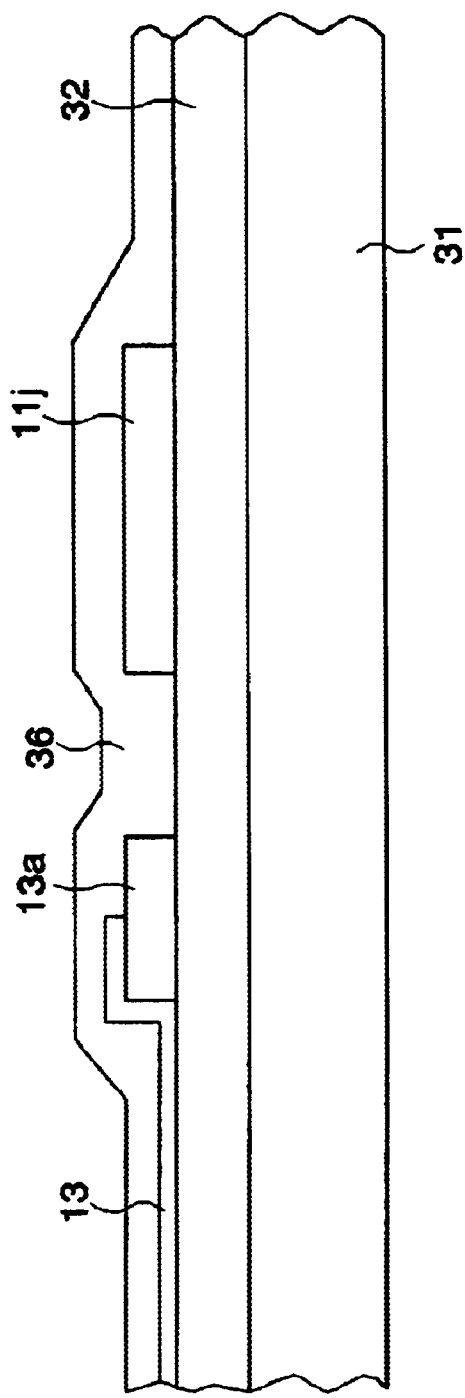
FIG. 8 is a cross-sectional view taken along the line VIII—VIII in FIG. 6.

FIGS. 6, 7 and 8 illustrate a liquid crystal display device in accordance with the first embodiment. FIG. 6 is a plan view of a TFT substrate in the liquid crystal display device, FIG. 7 is a cross-sectional view taken along the line VII—VII in FIG. 6, and FIG. 8 is a cross-sectional view taken along the line VIII—VIII in FIG. 6.

As illustrated in FIG. 6, the liquid crystal display device is comprised of a pixel electrode 13, a first signal line 11$i$ extending along one side of the pixel electrode 13, a second signal line 11$j$ extending along the other side of the pixel electrode 13, and a thin film transistor (TFT) 14 located at a corner of the pixel electrode 13 and between the pixel electrode 13 and the first signal line 11$i$.

The pixel electrode 13 includes a pixel edge section 13$a$ which defines an outer edge of the pixel electrode 13, and is located adjacent to the first and second signal lines 11$i$ and 11$j$ through the pixel edge section 13$a$. The pixel edge section 13$a$ is formed by being exposed to light simultaneously with the first and second signal lines 11$i$ and 11$j$.

A scanning line 12 extends perpendicularly to the first and second signal lines 11$i$ and 11$j$. A gate electrode (not illustrated) of the thin film transistor 14 is electrically connected to the scanning line 12.

The first signal line 11$i$ is formed with a projecting portion 11$a$ projecting towards the pixel electrode 13. The projecting portion 11$a$ is designed to have such a length that a first length along which the pixel electrode 13 is adjacent to the first signal line 11$i$ is equal to a second length along which the pixel electrode 13 is adjacent to the second signal line 11$j$. That is, assuming that a length along which the pixel electrode 13 is vertically adjacent to the first signal line 11$i$ is represented with "La", a length along which the pixel electrode 13 is horizontally adjacent to the projecting portion 11$a$ is represented with "Lb", a length along which the pixel electrode 13 is vertically adjacent to the projecting portion 11$a$ is represented with "Lc", and a length along which the pixel electrode 13 is adjacent to the second signal line 11$j$ is represented with "L", the projecting portion 11$a$ is designed to meet the following equation.

$$La+Lb+Lc=L \qquad (A)$$

A space "d" between the pixel edge section 13$a$ and the first signal line 11$i$ including the projecting 11$a$ is equal anywhere to a space "d" between the pixel edge section 13$a$ and the second signal line 11$j$.

In accordance with the first embodiment, a parasitic capacitance generated between the pixel electrode 13 and the first signal line 11$i$ is equal to a parasitic capacitance generated between the pixel electrode 13 and the second signal line 11$j$. This is not influenced by variance produced in fabrication steps.

Hence, the first embodiment makes it possible to prevent fluctuation in brightness of a pixel which fluctuation is caused by imbalance in a parasitic capacitance between the pixel electrode and the signal lines, ensuring high quality in display.

Though the first signal line 11$i$ is designed to have the projecting portion 11$a$ in the first embodiment, it should be noted that the second signal line 11$j$ may be designed to have the projecting portion 11$a$. As an alternative, the projecting portion 11$a$ may be formed both in the first and second signal lines 11$i$ and 11$j$.

Hereinbelow is explained a method of fabricating the liquid crystal display device illustrated in FIG. 6 with reference to FIGS. 7, 8 and 13.

First, as illustrated in FIG. 7, a pattern of a scanning line 12 composed of electrically conductive material such as metal is formed on a glass substrate 31 in step 100.

Then, a gate insulating film 32 composed of electrically insulating material such as silicon nitride is formed all over the glass substrate 31 and the scanning line pattern 12 in step 110.

Then, an amorphous silicon layer 33 which will make a channel of a transistor is formed on the gate insulating film 32 above the scanning line pattern 12 in step 120. Then, a contact layer 35 is formed on the amorphous silicon layer 33 in step 130 in order to establish electrical connection between the channel and later formed drain electrode 14$a$ and source electrode 14$b$.

Then, the first signal line 11$i$ is formed on the gate insulating film 32 as illustrated in FIG. 7, and the second signal line 11$j$ is formed on the gate insulating film 32 as illustrated in FIG. 8. Both the first and second signal lines 11$i$ and 11$j$ are composed of electrically conductive material such as metal. The first and/or second signal line(s) 11$i$ and 11$j$ are(is) formed to have a projecting portion 11$a$ in step 140 so that the above-mentioned equation (A) is established, that is, a first length along which the pixel electrode 13 is adjacent to the first signal line 11*i* is equal to a second length along which the pixel electrode 13 is adjacent to the second signal line 11*j*.

Simultaneously with the first and second signal lines 11*i* and 11*j* are formed the pixel edge section 13*a* through which the pixel electrode 13 is adjacent to the first and second signal lines 11*i* and 11*j*, a drain electrode 14*a*, and a source electrode 14*b* in step 140.

The pixel edge section 13*a* is formed in such a manner that a space "d" between the pixel edge section 13*a* and the first and second signal lines 11*i* and 11*j* is constant anywhere.

At this stage, the pixel edge section 13*a* may be electrically connected to the source electrode 14*b*, or may not.

Then, there is formed the pixel electrode 13 within the pixel edge section 13*a* so that the pixel electrode 13 makes contact with the pixel edge section 13*a*, in step 150. The pixel electrode 13 is composed of electrically conductive transparent material such as indium-tin-oxide (ITO). The pixel electrode 13 is formed so as to electrically connect with the pixel edge section 13*a* and the source electrode 14*b*, and so as to be located remoter from the first and second signal lines 11*i* and 11*j* than the pixel edge section 13*a*.

Since the contact layer 35 bridges over the drain electrode 14*a* and the source electrode 14*b*, the drain electrode 14*a* is kept in electrical connection with the source electrode 14*b*, if the contact layer 35 is kept as it is. Hence, a portion 35*a* of the contact layer 35 is removed between the drain electrode 14*a* and the source electrode 14*b* in step 160.

Then, as illustrated in FIGS. 7 and 8, an insulating protection film 36 composed of insulating material such as silicon nitride is deposited all over the liquid crystal display device in step 170. The insulating protection film 36 is not illustrated in FIG. 6 for simplification.

Then, unnecessary portions of the insulating protection film 36 are removed in step 180. Thus, a TFT substrate of the liquid crystal display device in accordance with the first embodiment is completed.

In accordance with the first embodiment, it is possible to equalize the parasitic capacitance generated between the pixel electrode 13 and the first signal line 11*i* to the parasitic capacitance generated between the pixel electrode 13 and the second signal line 11*j*.

Figure 1:
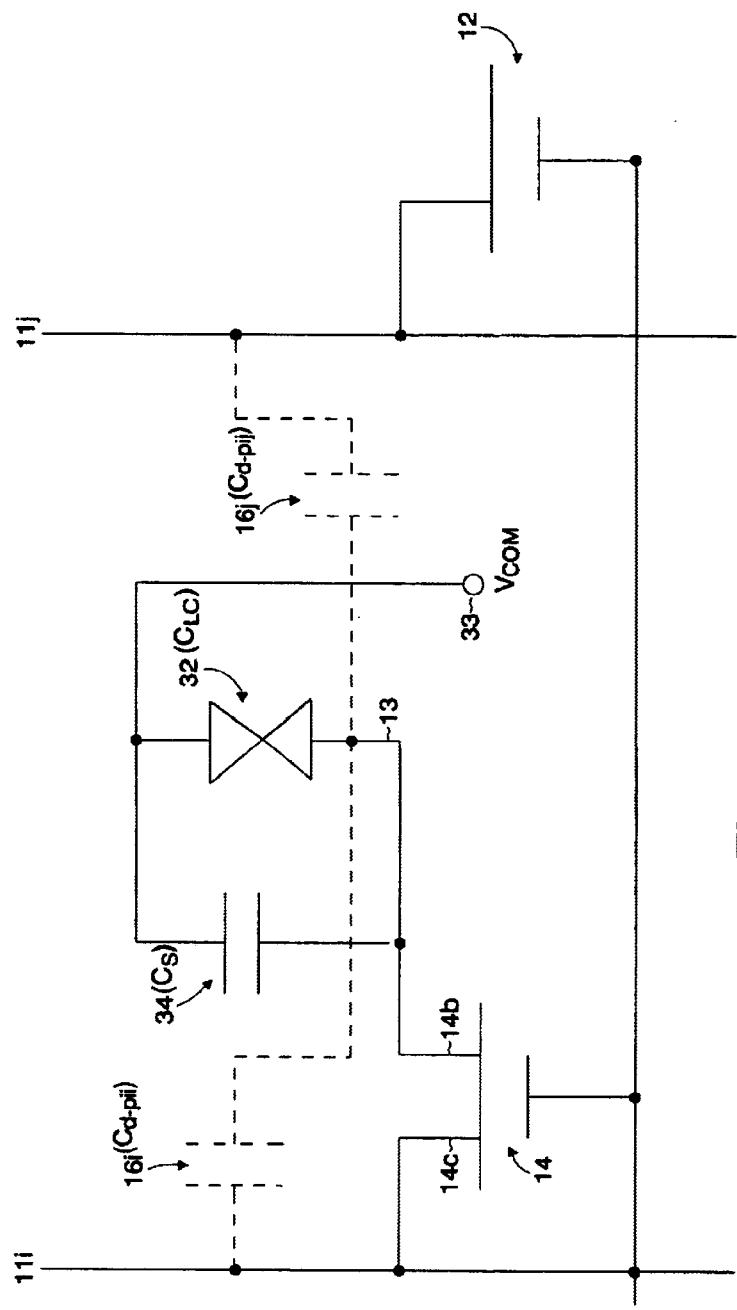
FIG. 1 is a circuit diagram of a circuit equivalent to a pixel in an active matrix type liquid crystal display device.
Figure 2:
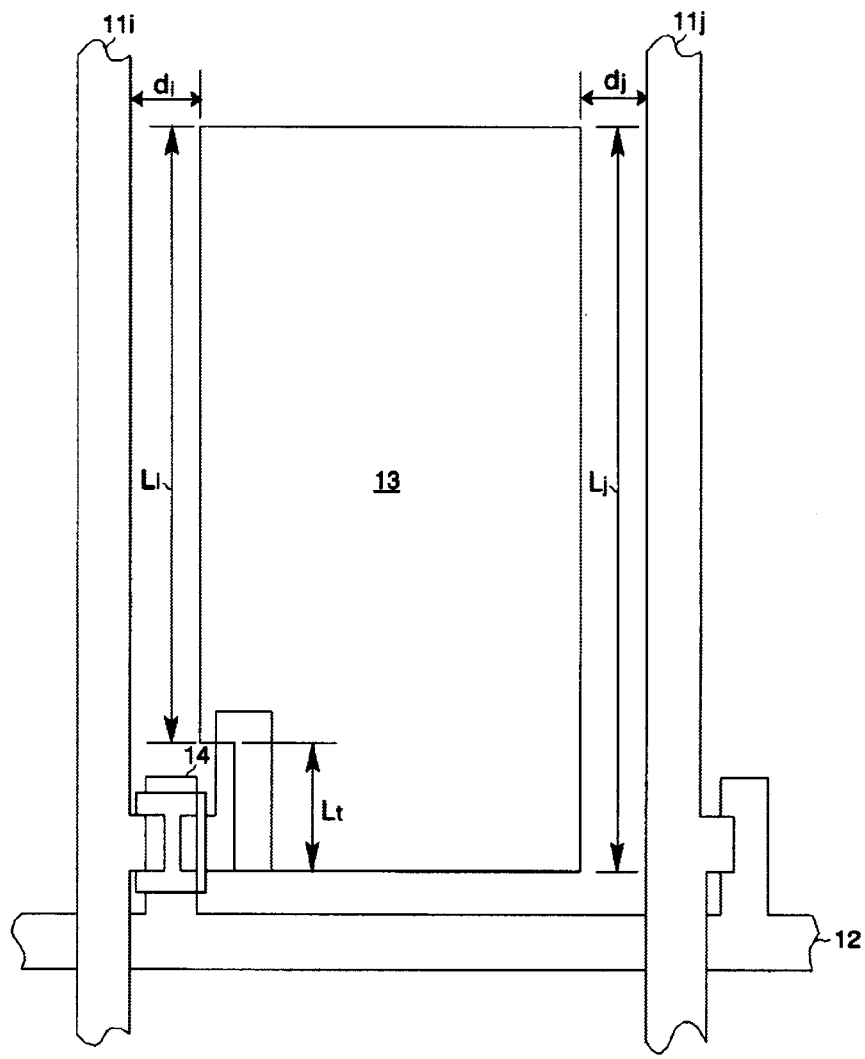
FIG. 2 is a plan view of a pixel in a conventional liquid crystal display device.
Figure 3A:
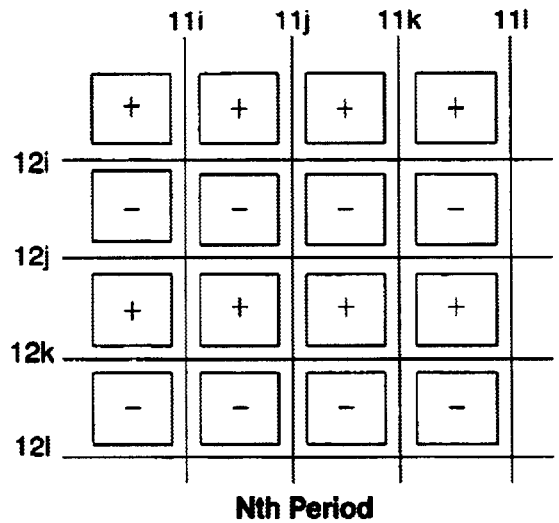
FIG. 3A illustrates polarity of pixel electrodes in a screen in a certain display-updating period in gate line inversion drive.
Figure 3B:
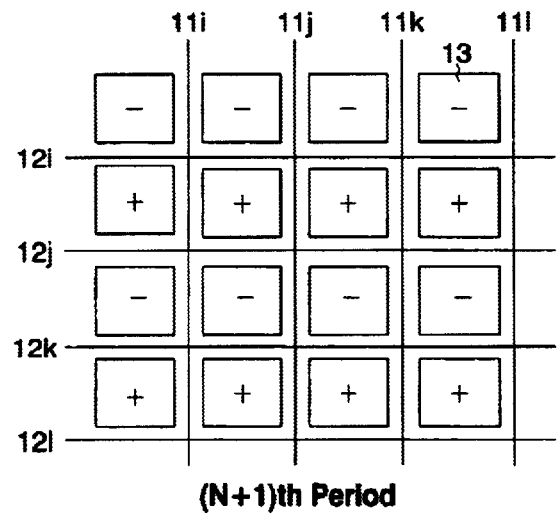
FIG. 3B illustrates polarity of pixel electrodes in a screen in a next display-updating period both in gate line inversion drive.

In the conventional liquid crystal display device illustrated in FIG. 2, the space di between the pixel electrode 13 and the first signal line 11*i* may be different from the space dj between the pixel electrode 13 and the second signal line 11*j* due to misalignment of masks which might occur when the pixel electrode 13 is exposed to light separately from the first and second signal lines 11*i* and 11*j*. However, in accordance with the first embodiment, the parasitic capacitances can be equalized to each other without being influenced by misalignment of masks.

Accordingly, the first embodiment makes it possible to prevent fluctuation in brightness of a pixel which fluctuation is caused by imbalance in parasitic capacitances between the pixel electrode 13 and the signal lines 11*i* and 11*j*, ensuring high quality in display.

Though the present invention is applied in the first embodiment to a channel etch type amorphous silicon TFT having a bottom gate structure, it should be noted that the present invention is not to be limited to the structure having been mentioned in the first embodiment. For instance, the present invention may be applied to a channel protection type amorphous silicon TFT or a polysilicon TFT.

As an alternative, the present invention may be applied to a liquid crystal display device including a non-linear element such as MIM as a driver element.

Figure 9:
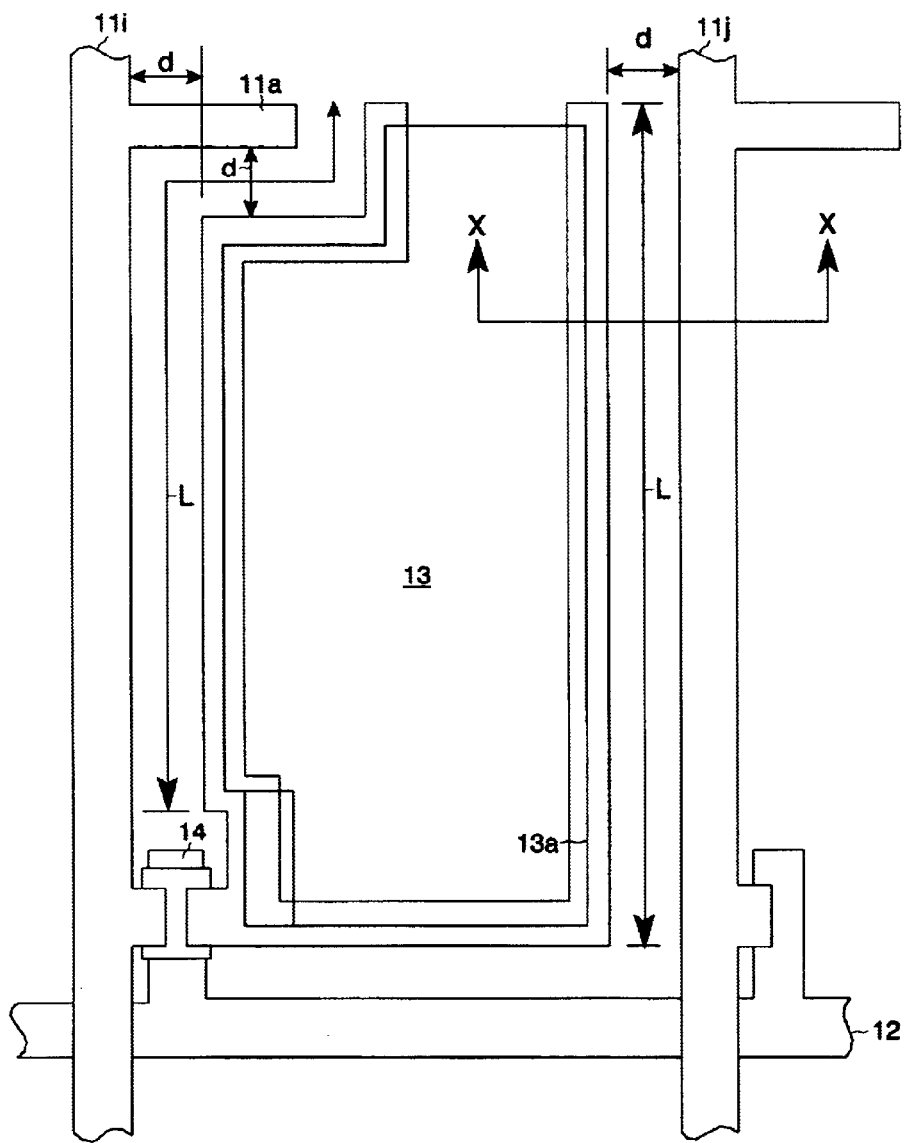
FIG. 9 is a plan view of a TFT substrate in a liquid crystal display device in accordance with the second embodiment of the present invention.
Figure 10:
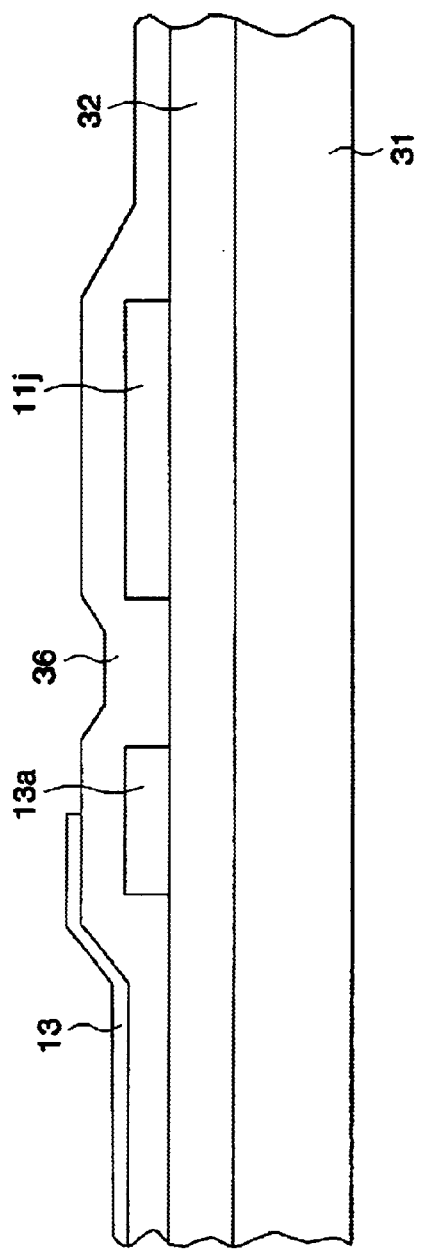
FIG. 10 is a cross-sectional view taken along the line X—X in FIG. 9.

FIG. 9 is a plan view of a TFT substrate in the liquid crystal display device in accordance with the second embodiment. FIG. 10 is a cross-sectional view taken along the line X—X in FIG. 9.

As illustrated in FIG. 9, the liquid crystal display device is comprised of a pixel electrode 13, a first signal line 11*i* extending along one side of the pixel electrode 13, a second signal line 11*j* extending along the other side of the pixel electrode 13, and a thin film transistor (TFT) 14 located at a corner of the pixel electrode 13 and between the pixel electrode 13 and the first signal line 11*i*.

The liquid crystal display device in accordance with the second embodiment has basically the same structure as that of the liquid crystal display device in accordance with the first embodiment. However, the second embodiment is different from the first embodiment with respect to fabrication steps. In the liquid crystal display device in accordance with the second embodiment, the pixel electrode 13 is formed after the formation of the insulating protection film 36 and the removal of unnecessary portions thereof. That is, the pixel electrode 13 and the first and second signal lines 11*i* and 11*j* are formed in a common layer in the first embodiment, as illustrated in FIGS. 7 and 8, whereas the pixel electrode 13 is formed in a layer separate from a layer in which the first and second signal lines 11*i* and 11*j* are formed, in the second embodiment, as illustrated in FIG. 10.

In FIG. 10, a thickness of the insulating protection film 36 is illustrated in exaggeration. In general, the insulating protection film 36 has a thickness of about 50 nm. A minimum space by which the pixel edge section 13*a* are spaced away from the first and second signal lines 11*i* and 11*j* without short-circuiting each other is generally in the range of 3 μm to 4 μm (3,000 nm to 4,000 nm). Hence, even if the pixel electrode 13 is formed in a layer separate from a layer in which the first and second signal lines 11*i* and 11*j* are formed, with the insulating protection film 36 being sandwiched between those layers, the second embodiment can provide the same advantages as those obtained by the first embodiment.

Though not illustrated, the pixel electrode 13 is designed to make electrical contact with the pixel edge section 13 at a certain point.

Figure 14:
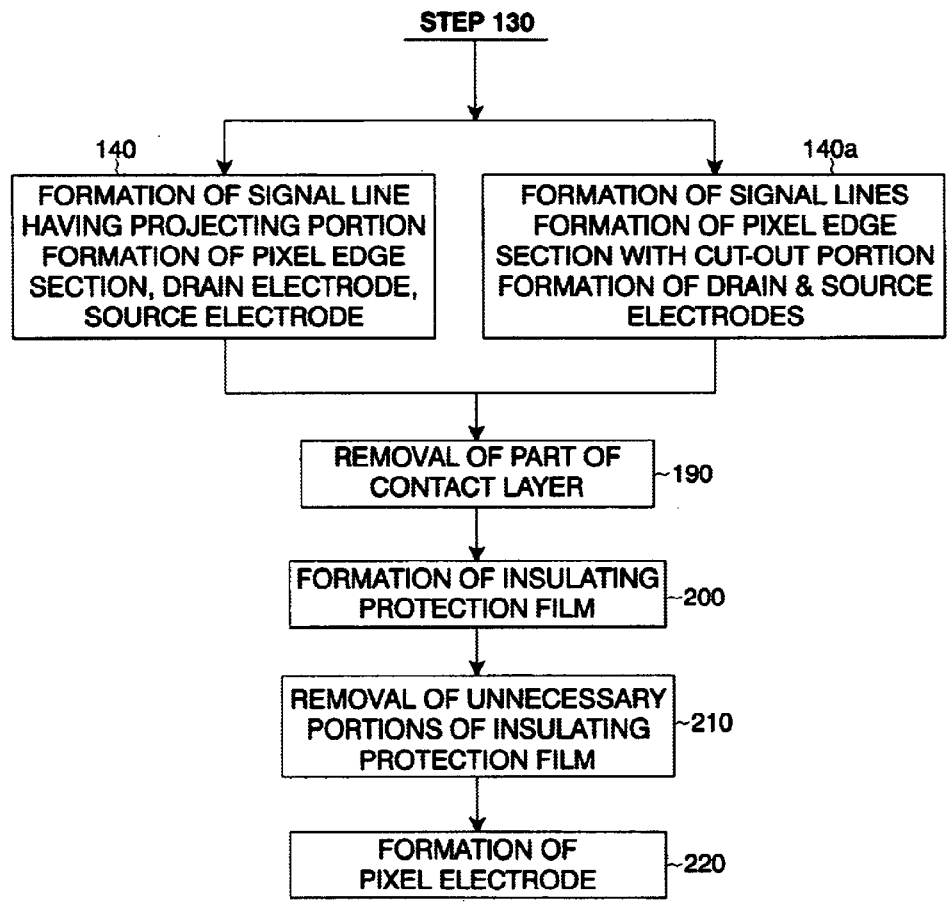
FIG. 14 is a partial flow chart of a method of fabricating the liquid crystal display device in accordance with the second embodiment.

FIG. 14 is a flow chart of a method of fabricating the liquid crystal display device in accordance with the second embodiment.

Figure 13:
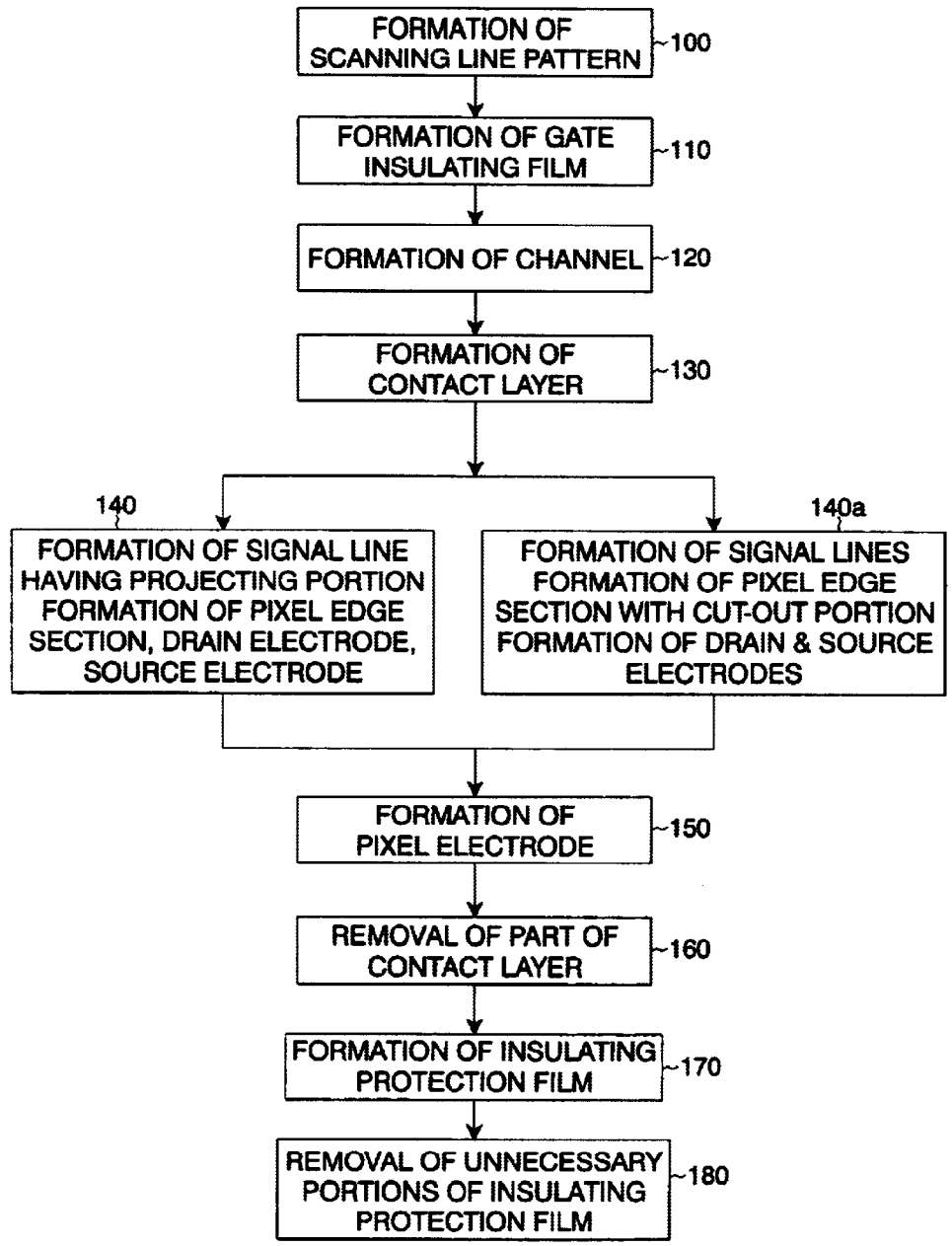
FIG. 13 is a flow chart of a method of fabricating the liquid crystal display device in accordance with the first, third or fourth embodiment.

The method has the same steps 100 to 140 illustrated in FIG. 13. In this method, after the step 140 has been carried out, a portion 35*a* of the contact layer 35 between the drain electrode 14*a* and the source electrode 14*b* is removed in step 190.

Then, the insulating protection film 36 composed of electrically insulating material such as silicon nitride is deposited all over the liquid crystal display device in step 200. Thereafter, unnecessary portions of the insulating protection film 36 are removed in step 210.

Then, as illustrated in FIG. 10, there is formed the pixel electrode 13 within the pixel edge section 13*a* so that pixel electrode 13 makes contact with the pixel edge section 13*a*, in step 220. The pixel electrode 13 is composed of electrically conductive transparent material such as indium-tin-oxide (ITO). The pixel electrode 13 is formed so as to electrically connect with the pixel edge section 13*a* and the source electrode 14*b*, and so as to be located remoter from the first and second signal lines 11*i* and 11*j* than the pixel edge section 13*a*.

Thus, there is completed a TFT substrate of the liquid crystal display device in accordance with the second embodiment.

Figure 11:
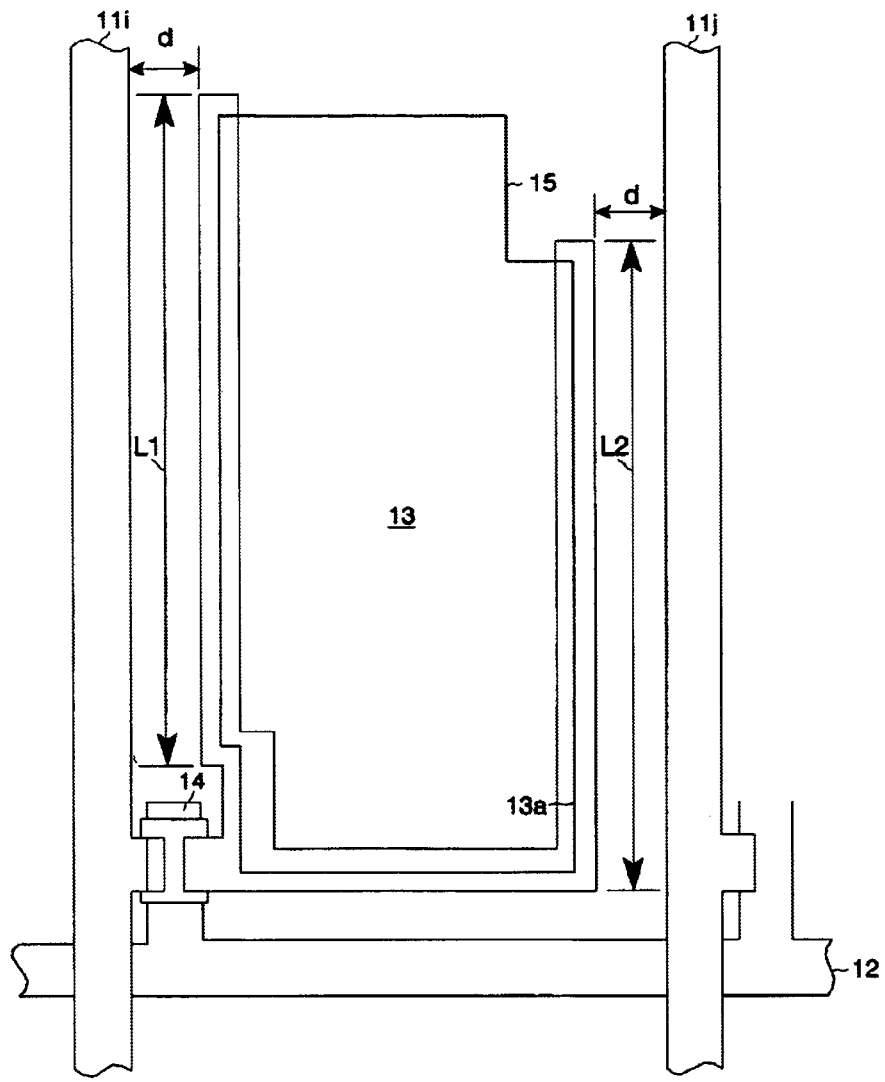
FIG. 11 is a plan view of a TN substrate in a liquid crystal display device in accordance with the third embodiment of the present invention.

FIG. 11 is a plan view of a TFT substrate in the liquid crystal display device in accordance with the third embodiment.

The liquid crystal display device in accordance with the third embodiment is structurally different from the liquid crystal display device in accordance with the first embodiment in that the pixel electrode 13 and the pixel edge section 13a are formed with a cut-out portion 15 in place of the projecting portion 11a formed at the first signal line 11i.

As illustrated in FIG. 11, the cut-out portion 15 is formed at a corner of the pixel electrode 13 at a side opposite to a side at which the thin film transistor 14 is formed.

The cut-out portion 15 is designed to have a length in a direction in which the signal lines 11i and 11j extend which length is equal to a length by which the first signal line 11i cannot be adjacent to the pixel electrode 13 due to presence of the thin film transistor 14. Accordingly, a first length L1 along which the pixel electrode 13 is adjacent to the first signal line 11i is equal to a second length L2 along which the pixel electrode 13 is adjacent to the second signal line 11j (L1=L2).

The pixel electrode 13 and the signal lines 11i and 11j may be formed in a common layer similarly to the first embodiment, or may be formed in separate layers similarly to the second embodiment.

In a method of fabricating the liquid crystal display device in accordance with the third embodiment, the step 140a is carried out in place of the step 140 in the method of fabricating the liquid crystal display device in accordance with the first embodiment, illustrated in FIG. 13. The steps 100 to 130 and 150 to 180 are carried out similarly to the first embodiment.

In the step 140a, the first and second signal lines 11i and 11j are formed, and there is also formed the pixel edge section 13a having the cut-out portion 15 at a corner thereof at a side opposite to a side at which the thin film transistor 14 is formed. The cut-out portion 15 is designed to have such a length that a first length L1 along which the pixel electrode 13 is adjacent to the first signal line 11i is equal to a second length L2 along which the pixel electrode 13 is adjacent to the second signal line 11j (L1=L2).

In addition, the drain electrode 14a and the source electrode 14b are formed at the same time.

In the step 150, the pixel electrode 13 is formed so as to have the cut-out portion 15 in harmony with the cut-out portion 15 formed at the pixel edge section 13a.

The pixel electrode 13 and the signal lines 11i and 11j in the third embodiment may be formed in separate layers, in which case, the steps illustrated in FIG. 14 are carried out in the same order as that of the second embodiment.

Figure 12:
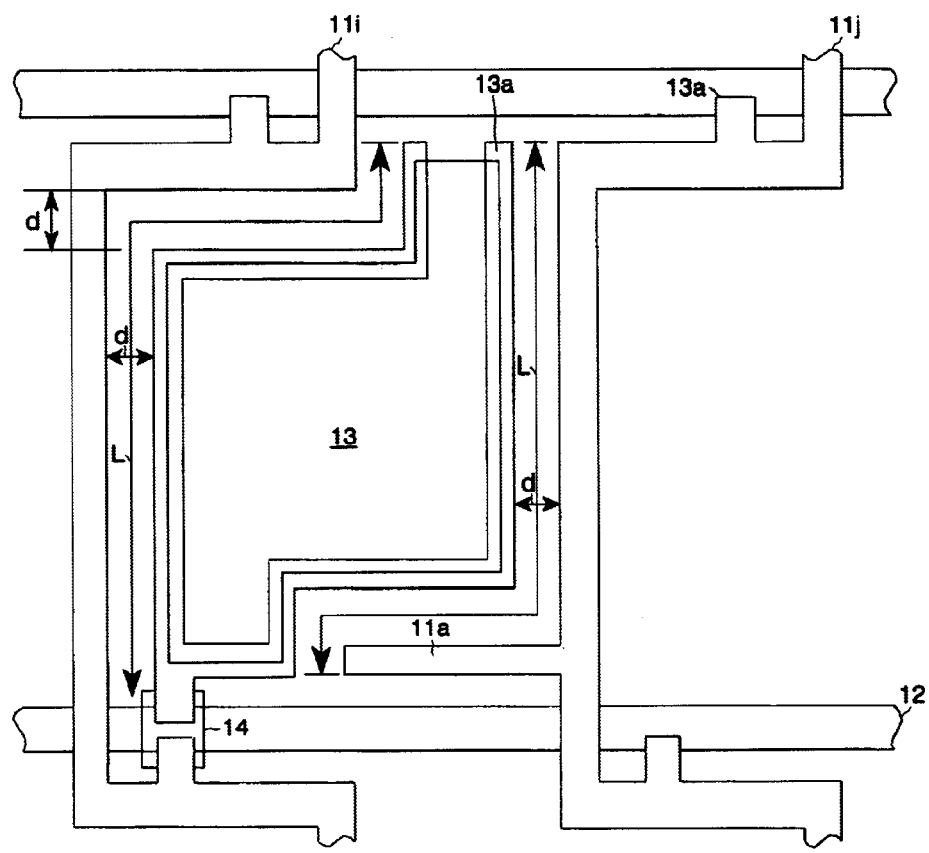
FIG. 12 is a plan view of a TFT substrate in a liquid crystal display device in accordance with the fourth embodiment of the present invention.

FIG. 12 is a plan view of a TFT substrate in the liquid crystal display device in accordance with the fourth embodiment.

In the fourth embodiment, the pixel electrodes 13 are arranged in delta-arrangement in which a line of the pixel electrodes 13 sandwiched between adjacent scanning lines 12 are deviated by half-pitch from an adjacent line of the pixel electrodes 13.

In a liquid crystal display device arranged in delta-arrangement, as illustrated in FIG. 12, it is necessary to design the first and second signal lines 11i and 11j not to interfere with the pixel electrode 13. Accordingly, the first and second signal lines 11i and 11j have a bending portion in harmony with a shape of the pixel electrode 13. Hence, a length L1 along which the pixel electrode 13 is adjacent to the first signal line 11i is generally remarkably different from a length L2 along which the pixel electrode 13 is adjacent to the second signal line 11j, resulting in that a voltage of the pixel electrode 13 is significantly influenced by voltages of the first and second signal lines 11i and 11j.

In order to solve such a problem, the second signal line 11j in the fourth embodiment is formed with a projecting portion 11a projecting towards the pixel electrode 13, to thereby ensure that a first length L1 along which the pixel electrode 13 is adjacent to the first signal line 11i is equal to a second length L2 along which the pixel electrode 13 is adjacent to the second signal line 11j (L1=L2).

In addition, the pixel edge section 13a is exposed to light concurrently with the first and second signal lines 11i and 11j, which ensures that a voltage of the pixel electrode 13 is less influenced by voltages of the first and second signal lines 11i and 11j.

The pixel electrode 13 and the signal lines 11i and 11j may be formed in a common layer similarly to the above-mentioned embodiments, in which ease, the steps illustrated in FIG. 13 are carried out in the same order as having been explained earlier with reference to FIG. 13. As an alternative, the pixel electrode 13 and the signal lines 11i and 11j may be formed in separate layers, in which case, the steps illustrated in FIG. 14 are carried out in the same order as having been explained earlier with reference to FIG. 14.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 10-271140 filed on Sep. 25, 1998 including specification, claims, drawings and summary is incorporated herein by reference in its entirety.

What is claimed is:

1. A liquid crystal display device comprising:
   (a) a pixel electrode, wherein said pixel electrode includes a pixel edge section;
   (b) a thin film transistor located adjacent to said pixel electrode and at one side of said pixel electrode;
   (c) a first signal line extending along said one side of said pixel electrode; and
   (d) a second signal line extending along the other side of said pixel electrode,
   said pixel electrode being formed with a cut-out portion at the other side thereof, said cut-out portion having a length equal to a length along which said first signal line cannot be adjacent to said pixel electrode by said thin film transistor,
   a first length along which said pixel electrode and said first signal line are adjacent to each other being equal to a second length along which said pixel electrode and said second signal line are adjacent to each other,
   a first space between said pixel edge section and said first signal line being equal to a second space between said pixel edge section and said second signal line.

2. The liquid crystal display device as set forth in claim 1, wherein said pixel electrode is formed on a layer in which said first and second signal lines are also formed.

3. The liquid crystal display device as set forth in claim 1, wherein said first and second signal lines are formed on a first layer, and said pixel electrode is formed on a second layer which is electrically isolated from said first layer by an insulating layer sandwiched between said first and second layers.

4. A liquid crystal display device comprising:
   (a) a plurality of pixel electrodes each spaced away from adjacent ones by a predetermined distance, wherein said pixel electrodes include pixel edge sections;
   (b) first signal lines each extending along one side of each of said pixel electrodes, each of said first signal lines having a bending portion which extends along a periphery of each of said pixel electrodes; and
   (c) second signal lines each extending along the other side of each of said pixel electrodes, each of said second signal lines having a bending portion which extends along a periphery of each of said pixel electrodes,
      at least one of said first and second signal lines having a projecting portion extending towards said pixel electrodes,
      a first length along which said pixel electrodes and said first signal lines are adjacent to each other being equal to a second length along which said pixel electrodes and said second signal lines are adjacent to each other,
      a first space between said pixel edge sections and said first signal lines being equal to a second space between said pixel edge sections and said second signal lines.

5. The liquid crystal display device as set forth in claim 4, wherein each of said pixel electrodes is formed on a layer in which said first and second signal lines are also formed.

6. The liquid crystal display device as set forth in claim 4, wherein said first and second signal lines are formed on a first layer, and said pixel electrodes are formed on a second layer which is electrically isolated from said first layer by an insulating layer sandwiched between said first and second layers.

7. A method of fabricating a liquid crystal display device including a pixel electrode, a pixel edge section, a first signal line extending along one side of said pixel electrode, and a second signal line extending along the other side of said pixel electrode, comprising the steps of:
   (a) forming a scanning line on a transparent substrate, and then, forming a gate insulating film on said scanning line and said transparent substrate;
   (b) forming a channel on said gate insulating film above said scanning line;
   (c) forming said pixel edge section and said first and second signal lines so that a first length along which said pixel electrode and said first signal line are adjacent to each other is equal to a second length along which said pixel electrode and said second signal line are adjacent to each other, and a first space between said pixel edge section and said first signal line is equal to a second space between said pixel edge section and said second signal line,
   (d) forming said pixel electrode; and
   (e) covering a product resulting from said step (d) with an insulating layer.

8. The method as set forth in claim 7, wherein said pixel electrode is formed between said first and second signal lines on a common layer in said step (d).

9. The method as set forth in claim 8, wherein said pixel electrode is formed, after said gate insulating film has been formed, on said gate insulating film above a region sandwiched between said first and second signal lines.

10. A method of fabricating a liquid crystal display device including a pixel electrode, a pixel edge section, a first signal line extending along one side of said pixel electrode, and a second signal line extending along the other side of said pixel electrode, comprising the steps of:
    (a) forming a scanning line on a transparent substrate, and then, forming a gate insulating film on said scanning line and said transparent substrate;
    (b) forming a channel on said gate insulating film above said scanning line;
    (c) forming said pixel edge section and said first and second signal lines so that at least one of said first and second signal lines has a projecting portion extending towards said pixel electrode and that a first length along which said pixel electrode and said first signal line are adjacent to each other is equal to a second length along which said pixel electrode and said second signal line are adjacent to each other, and a first space between said pixel edge section and said first signal line is equal to a second space between said pixel edge section and said second signal line,
    (d) forming said pixel electrode; and
    (e) covering a product resulting from said step (d) with an insulating layer.

11. The method as set forth in claim 10, wherein said pixel electrode is formed between said first and second signal lines on a common layer in said step (d).

12. The method as set forth in claim 10, wherein said pixel electrode is formed, after said gate insulating film has been formed, on said gate insulating film above a region sandwiched between said first and second signal lines.

13. A method of fabricating a liquid crystal display device including a pixel electrode, a pixel edge section, a first signal line extending along one side of said pixel electrode, and a second signal line extending along the other side of said pixel electrode, comprising the steps of:
    (a) forming a scanning line on a transparent substrate, and then, forming a gate insulating film on said scanning line and said transparent substrate;
    (b) forming a channel on said gate insulating film above said scanning line;
    (c) forming said pixel edge section with a cut-out portion and forming said first and second signal lines so that said cut-out portion has a length equal to a length along which said first and/or second signal line(s) cannot be adjacent to said pixel electrode by a thin film transistor formed at one side of said pixel electrode,
       a first length along which said pixel electrode and said first signal line are adjacent to each other being equal to a second length along which said pixel electrode and said second signal line are adjacent to each other,
       a first space between said pixel electrode and said first signal line being equal to a second space between said pixel electrode and said second signal line,
    (d) forming said pixel electrode; and
    (e) covering a product resulting from said step (d) with an insulating layer.

14. The method as set forth in claim 13, wherein said pixel electrode is formed between said first and second signal lines on a common layer in said step (d).

15. The method as set forth in claim 13, wherein said pixel electrode is formed, after said gate insulating film has been formed, on said sate insulating film above a region sandwiched between said first and second signal lines.

16. A method of fabricating a liquid crystal display device including a plurality of pixel electrodes each spaced away from adjacent ones by a predetermined distance, said pixel electrodes having pixel edge sections, first signal lines each extending along one side of each of said pixel electrodes, each of said first signal lines having a projecting portion which extends along a periphery of each of said pixel electrodes, and second signal lines each extending along the other side of each of said pixel electrodes, each of said second signal lines having a projecting portion which extends along a periphery of each of said pixel electrodes, comprising the steps of:

(a) forming a scanning line on a transparent substrate, and then, forming a gate insulating film on said scanning line and said transparent substrate;
   (b) forming a channel on said gate insulating film above said scanning line;
   (c) forming said pixel edge sections and said first and second signal lines so that at least one of each of said first signal lines and each of said second signal lines has a projecting portion extending towards each of said pixel electrodes and that a first length along which each of said pixel electrodes and each of said first signal lines are adjacent to each other is equal to a second length along which each of said pixel electrodes and each of said second signal lines are adjacent to each other, and a first space between each of said pixel edge sections and each of said first signal lines is equal to a second space between each of said pixel edge sections and each of said second signal lines,
   (d) forming said pixel electrodes; and
   (e) covering a product resulting from said step (d) with an insulating layer.

17. The method as set forth in claim 16, wherein each of said pixel electrodes is formed between each of said first signal lines and each of said second signal lines on a common layer in said step (d).

18. The method as set forth in claim 16, wherein each of said pixel electrodes is formed, after said gate insulating film has been formed, on said gate insulating film above a region sandwiched between said first and second signal lines.

* * * * *